(12) United States Patent
Gowing (10) Patent No.: US 6,641,178 B2
(45) Date of Patent: Nov. 4, 2003

(54) JOINTING SYSTEM FOR PIPES (75) Inventor: Denis Brendan Gowing, Dublin (IE)

(73) Assignee: Coda Limited, Dublin (IE)

( * ) Notice: Subject to any disclaimer, the term of this patent is extended or adjusted under 35 U.S.C. 154(b) by 0 days.

(21) Appl. No.: 09/867,566

(22) Filed: May 31, 2001

(65) Prior Publication Data

US 2001/0038205 A1 Nov. 8, 2001

Related U.S. Application Data (63) Continuation of application No. PCT/IE99/00128, filed on Dec. 6, 1999.

(30) Foreign Application Priority Data

Dec. 4, 1998 (IE) .................................................. 981012

(51) Int. Cl.$^7$ ................................................. F16L 29/00
(52) U.S. Cl. ........................ 285/347; 285/912; 285/337; 285/343
(58) Field of Search ................................. 285/349, 347, 285/343, 337, 912, 354, 388

(56) References Cited

U.S. PATENT DOCUMENTS

| | | | | |
|---|---|---|---|---|
| 18,116 A | * | 9/1857 | Wright | 285/343 |
| 898,723 A | * | 9/1908 | Clark | 285/369 |
| 964,609 A | * | 7/1910 | Clark | 285/337 |
| 2,343,235 A | * | 2/1944 | Bashark | 285/220 |
| 2,653,040 A | * | 9/1953 | Galluppi | 285/230 |
| 2,907,242 A | * | 10/1959 | Chakroff | 81/57.15 |
| 3,502,356 A | * | 3/1970 | Schmunk | 285/230 |
| 3,920,270 A | | 11/1975 | Babb, Jr. | 285/104 |
| 3,957,295 A | * | 5/1976 | Gould et al. | 285/342 |
| 4,039,211 A | | 8/1977 | Daspit | 285/184 |
| 4,135,866 A | * | 1/1979 | Winkler | 422/103 |
| 4,346,923 A | * | 8/1982 | Smith et al. | 285/340 |
| 5,040,831 A | | 8/1991 | Lewis | 285/305 |
| 5,056,755 A | * | 10/1991 | Jang et al. | 251/148 |
| 5,413,388 A | | 5/1995 | Kolvereid | 285/323 |
| 5,615,481 A | | 4/1997 | Viegener et al. | 29/890 |
| 5,779,283 A | | 7/1998 | Kimura et al. | 285/305 |
| 6,254,147 B1 | * | 7/2001 | Edwards | 285/334.4 |
| 6,464,260 B1 | * | 10/2002 | Barrier | 285/91 |

FOREIGN PATENT DOCUMENTS

| | | |
|---|---|---|
| DE | 2217488 | 10/1973 |
| FR | 1597177 | 7/1970 |
| FR | 2469637 | 5/1981 |
| GB | 1520150 | 8/1978 |
| GB | 1556008 | 11/1979 |
| GB | 2075141 A | 11/1981 |
| GB | 2254389 A | 10/1992 |

* cited by examiner

Primary Examiner—Eric K. Nicholson
(74) Attorney, Agent, or Firm—Jacobson Holman PLLC (57) ABSTRACT A copper pipe has a circumferential groove formed in an outer wall to receiver an O-ring seal. The groove is formed a pre-set distance from a free end of the pipe. Two pipe lengths are jointed together by a coupling having a housing with pipe seal-receiving seats at each end for receiving the O-ring seal fitted to the pipe. Caps screw threadingly engage the housing to clamp the pipe lengths in the housing. The fitting can be pre-assembled and used as a push-in fitting with a subsequent tightening by hand.

16 Claims, 9 Drawing Sheets

JOINTING SYSTEM FOR PIPES

This is a Continuation Application of PCT International Application No. PCT/IE99/00128, filed Dec. 6, 1999.

INTRODUCTION

The invention relates to a jointing system for joining pipes, especially copper plumbing pipes.

Conventionally, copper pipes are joined by compression-joints, consisting of brass fittings and shaped washers (olives). The jointing method is time consuming, costly, and requires specialist equipment. It also requires a skilled workman to effect a correct water-tight joint. A further disadvantage is that once joined, the olive which is shaped on fitting, cannot be reused. In addition, such joint fittings are often positioned in locations which are difficult to access with conventional spanners and the like.

Another known method of joining copper pipes involves soldered or pre-soldered joints. Whilst such systems require less skill, the joints formed are not reversible and/or adjustable after fitting. If the fitting leaks after installation it is difficult and time consuming to correct the problem. In addition, a blow torch is required which can be dangerous. Also, soldered joints cannot be reliably effected to old pipes or existing installations where the water has not been fully drained from the system.

GB-A-150150 describes a pipe coupling comprising a housing with open ends to receive pipe lengths and caps which are screwed to the housing in an effort to provide a sealed unit. The sealing system used is however very complex to assemble and inefficient in use.

GB-A-1556008 describes a modification to the coupling of GB 1520150 in an effort to provide improved sealing. However, again the seal is complex and inefficient.

GB-A-2075141 describes a coupling in the form of a unitary annular sleeve to receive pipe lengths. Separate annular grooves are provided in the sleeve with different types of seals in an effort to enhance the sealing effect. However, the sealing system is generally complex and inefficient. Further, the coupling is difficult to disassemble and apparently cannot be re-used.

GB-A-2254389 describes a system for forming sealing joints in pipe fittings. The fitting is internal of the pipe and will therefore cause a reduction in flow capacity. A complex fitting procedure is required which includes a double crimping operation. Therefore it would not be suitable for use in confined spaces. Further, the pipe would require very careful preparation by de-burning to ensure that the pipe can accept the fitting. Again the system is complex and inefficient.

U.S. Pat. No. 5,615,481 describes the production of highly complex circumferentially compressible pipe fittings. The pipe fitting is intended to be placed around a pipe end or stub. The body of the pipe fitting is formed with bulges to accept an O-ring seal. After insertion of the pipes a circumferential pressure is applied to squeeze the fitting around the pipes. The fitting is thus permanently in place and cannot easily be opened and especially cannot be re-used.

U.S. Pat. No. 5,040,831 deals with a non-threaded pipe connection system in which pipes of different diameters are overlapped and a special tool is used to crimp the outer pipe onto the inner pipe. This tool has to be hammered into place which is not convenient as a confined area. The pipe may also be easily damaged on fitting.

U.S. Pat No. 5,413,388 describes a compression type pipe joint using a threaded clamp having a longitudianily slotted inner sleeve. The fitting is similar to a standard olive base system and suffers from similar disadvantages.

U.S. Pat No. 5,779,283 describes a non threaded pipe connection in which pipes are joined by an outer sleeve section. Pins are driven through the sleeve to deformably engage the pipes. This system is time-consuming and difficult, especially in confined spaces. The sealing is not efficient and the joint cannot be opened and re-made or re-used. The deformation of the pipe to receive the pins may not be regular and damage to the pipe and/or coupling may result.

There is therefore a need for an improved jointing system which will overcome these difficulties.

STATEMENTS OF INVENTION

According to the invention there is provided a pipe fitting comprising:

a housing having at least one opening for receiving a pipe;
  the housing having a pipe seal-receiving seat for receiving a circumferential seal; and
  clamping means which is engagable with the housing for sealing engaging the seal against the pipe in the housing.

In an especially preferred embodiment of the invention the pipe has a circumferential groove for receiving the seal.

In one embodiment of the invention the clamping means comprises a cap.

Preferably the cap is screw threadingly engagable with the housing.

In a preferred embodiment of the invention the housing includes a stop means against which a free end of the pipe is engaged, on sealing.

In one embodiment of the invention the fitting includes locking means for locking the pipe in the fitting. Such a locking means would prevent unauthorised disassembly and removal of the fitting and associated pipework.

Preferably the locking means locks the clamping means to the housing.

In a preferred embodiment the locking means facilitates tightening of the clamping means beyond hand tightness.

Preferably the fitting includes a key for releasing the locking means.

In a preferred embodiment of the invention the locking means comprises keyengagable detents on the housing and/or the cap for tightening of the cap to the housing.

In one aspect the detents comprise a plurality of circumferentially spaced-apart teeth extending longitudinally are of the cap or housing and a key-receiving recess in the other of the cap or housing, the cap being rotatable on engagement of the key in the key-receiving recess and rotation of the key.

In one embodiment the fitting is a straight-through coupling having a pair of axially aligned pipe receiving openings.

In a particularly preferred embodiment of the invention the pipe is a pipe or pipe section having a circumferential groove formed in an outer wall thereof for receiving a complementary circumferential seal.

Most preferably the seal is mounted in the circumferential groove of the pipe. Ideally, the seal is an O-ring seal.

In a particularly important aspect the groove is formed a pre-set distance from a free end of the pipe or pipe section.

In one case the pipe is a copper pipe.

The housing may be of a metallic material or of a suitable plastics material.

In another embodiment the housing and/or the clamping means have means for sealingly engaging the seal against a pipe on closing of the clamping means.

Preferably the means for sealingly engaging the seal against a pipe comprises an open-ended circumferential slot in the housing, the seal being received in the slot on operation of the clamping means. Ideally the slot tapers inwardly from the open end thereof.

In a preferred embodiment the pipe is initially a push fit in the fitting and the clamping means is then tightened to sealingly engage the seal against the pipe.

In another aspect the invention provides a pipe working tool having an opening to receive a pipe or pipe section and groove forming means for forming a circumferential groove in an outer wall of the pipe.

In this case preferably the tool includes means for setting the location of the groove in relation to a datum.

In one embodiment the setting means is a stop means against which a free end of the pipe is engaged.

The tool preferably also includes cutting means for cutting a pipe to a desired length.

The tool preferably includes a pair of spaced-apart groove forming means and a cutting means between the groove forming means for forming a pair of grooves in a length of pipe and for cutting the pipe intermediate the grooves.

In a further aspect the invention provides a pipe or pipe section having a circumferential groove formed in the outer wall thereof for receiving a complementary circumferential seal.

In this case preferably the seal is an O-ring seal.

It is important that the groove is formed at a pre-set distance from a free end of the pipe or pipe section.

In one case the pipe is of a copper pipe.

The invention further provides a plumbing assembly including one or more of pipe or pipe sections of the invention and/or one or more pipe fittings of the invention and/or a pipe working tool of the invention.

BRIEF DESCRIPTION OF DRAWINGS

The invention will be more clearly understood from the following description thereof given by way of example only, in which.

DETAILED DESCRIPTION

Referring to the drawings there is illustrated a pipe or pipe section, especially a copper pipe 1 having a circumferentially extending groove 2 formed in an outer wall for receiving a complementary seal, in this case an O-ring seal 3. The groove 2 is formed a pre-set distance from a free end 5 of the pipe 1.

Figure 1:
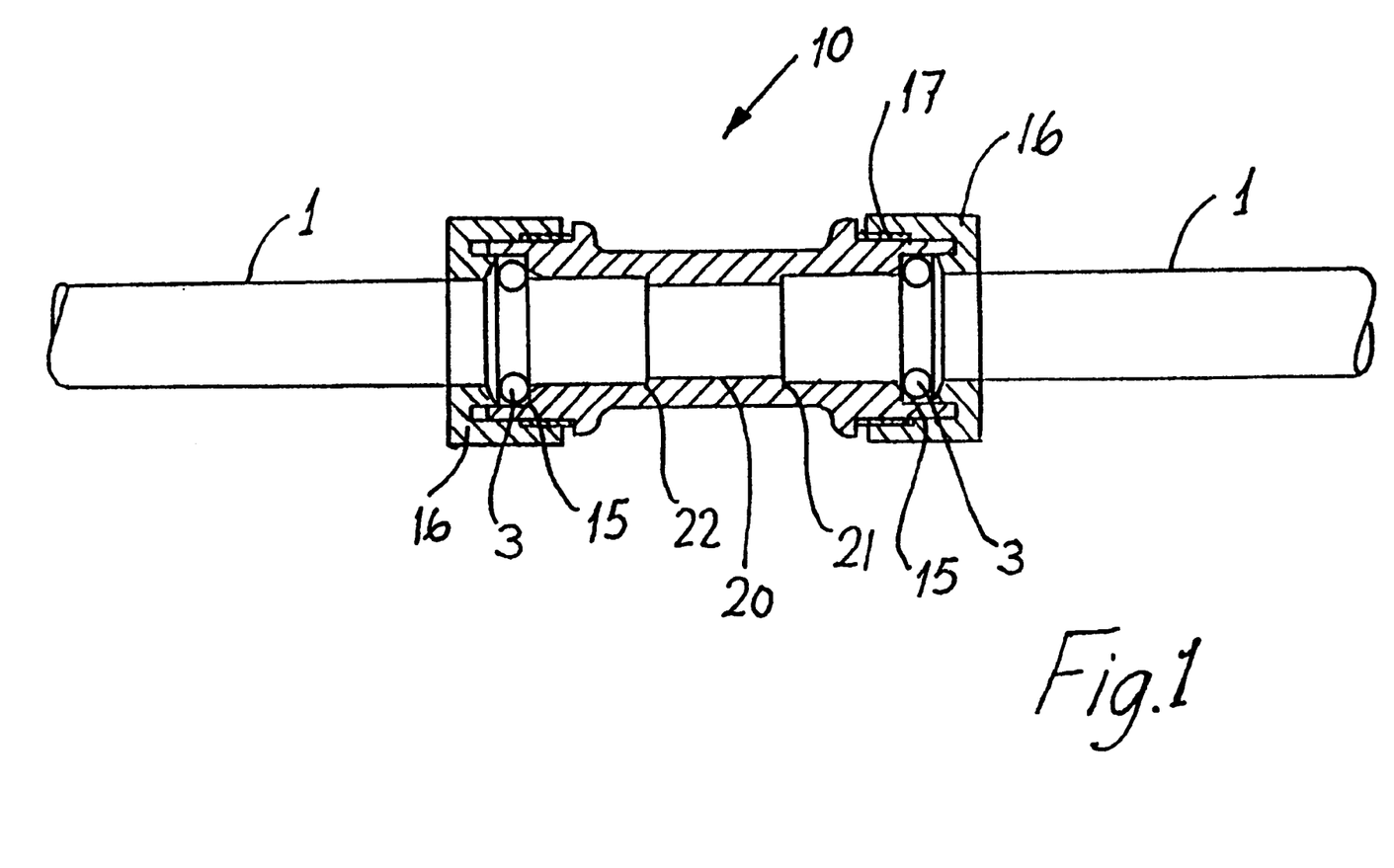
FIG. 1 is a side partially cross sectional view of an assembled pipe coupling according to the invention.
Figure 2:
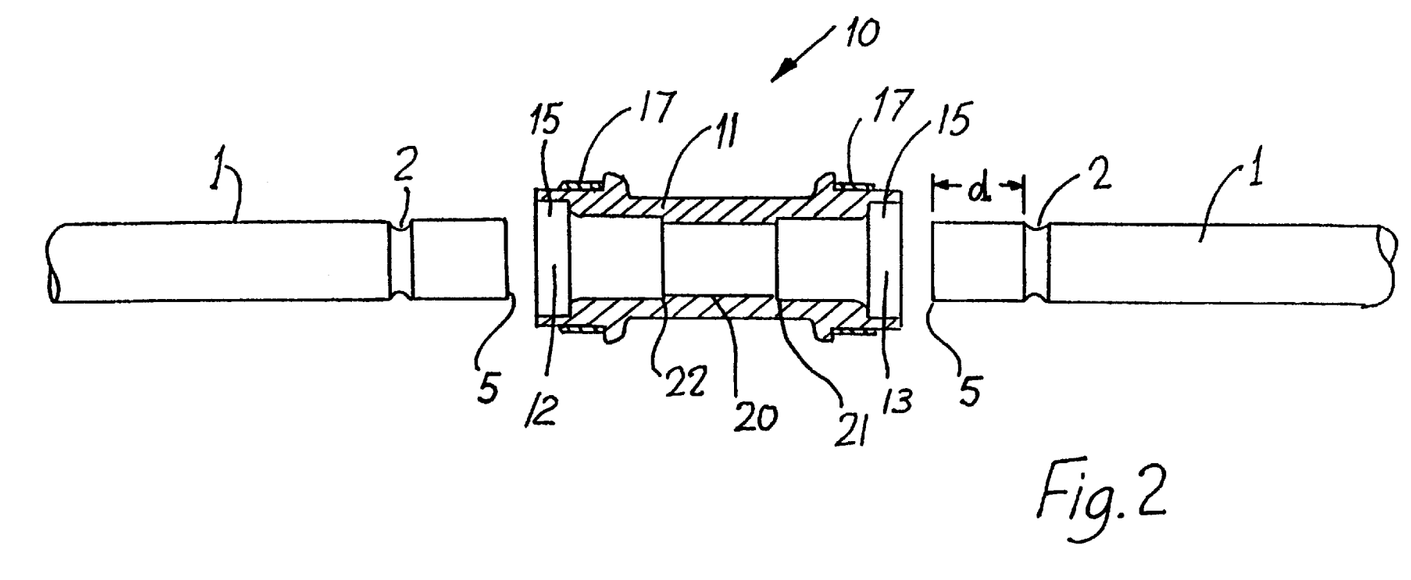
FIGS. 2 to 4 are side views illustrating various steps used in forming the coupling of FIG. 1.
Figure 3:
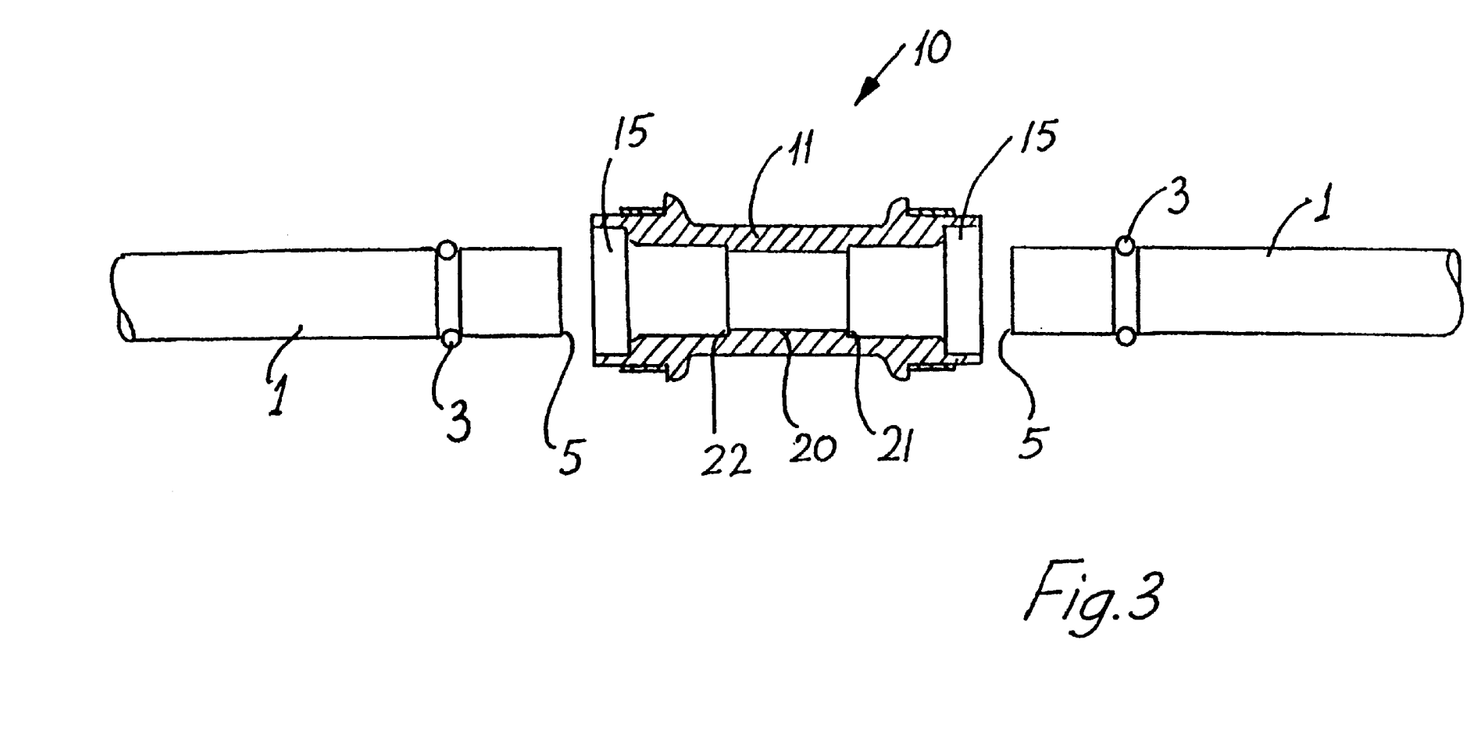
Figure 4:
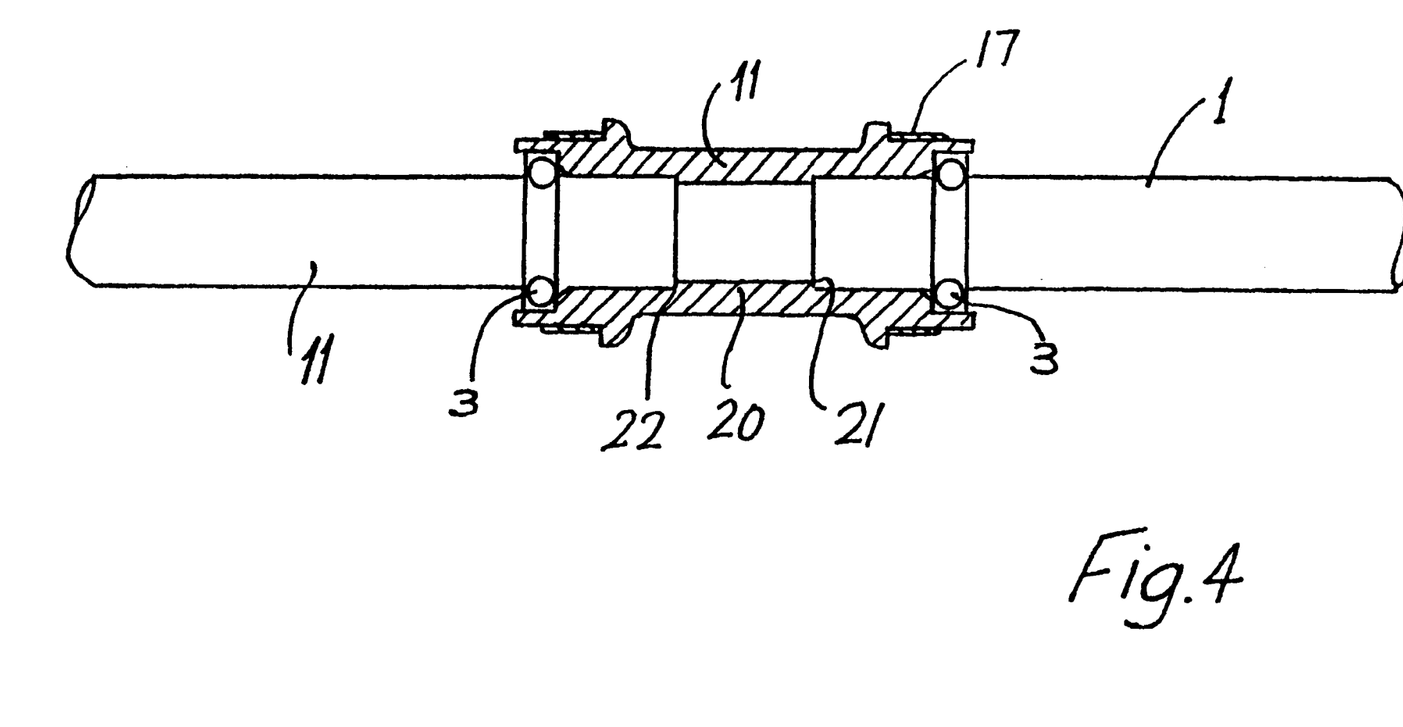
Figure 5:
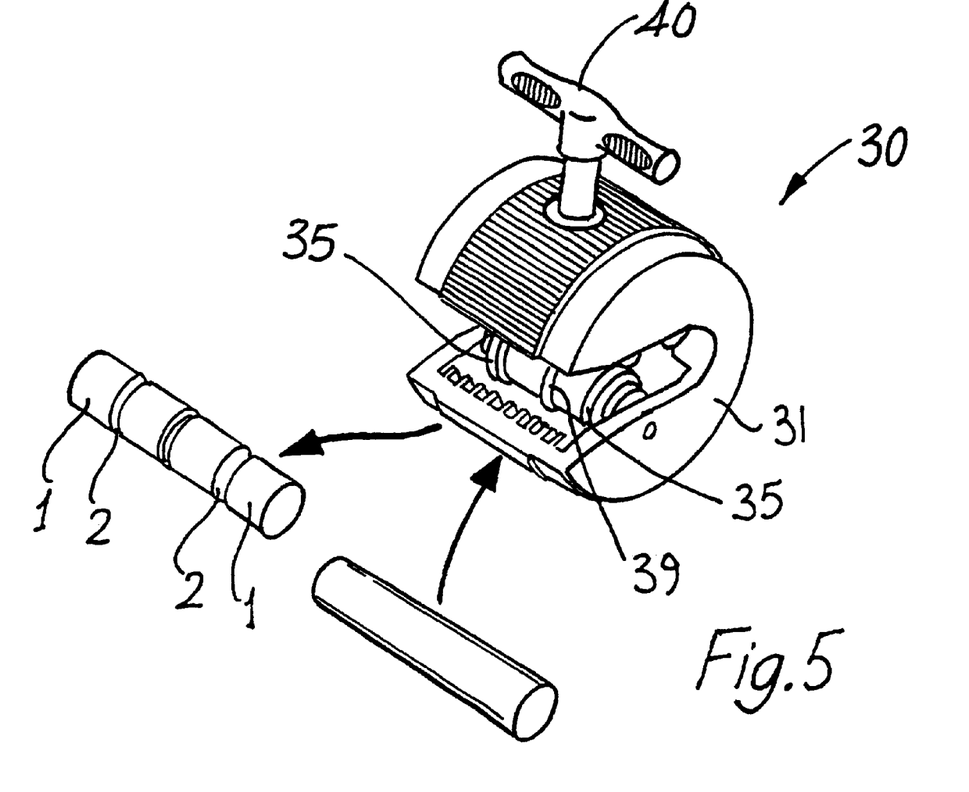
FIG. 5 is a perspective view of a pipe working tool according to the invention.

Two pipe lengths 1 are jointed together by a pipe fitting, in this case a straight-through coupling 10. The coupling 10 comprises a housing 11 having openings 12, 13 for receiving the pipe lengths 1 at either end. Each end of the housing 11 has a pipe seal-receiving seat 15 for receiving the O-ring seal 3 fitted to a pipe 1. A cap 16 screw threadingly engages the housing 11 by screw threads 17 for sealingly engaging the pipe lengths 1 in the housing 11.

The housing 11 includes a land 20 which defines stop surfaces 21, 22 against which the free-ends 5 of the pipes 1 engage, on coupling engagement. The distance d between the free end 5 of a pipe 1 and the seal-receiving groove 2 is set to ensure that the free ends 5 are engaged against the stop surfaces 21, 22 and that each seal 3 is effectively housed within its seat 15 to ensure a leak-tight joint on assembly.

It will be appreciated that the coupling may be of any desired shape and configuration including a right angle coupling, a blind coupling, a y-coupling, a coupling attached to a machine such as a washing machine or the like.

The coupling may be of any suitable material such as metal, for example brass, or may be of a suitable plastics material which may be injection molded.

The pipe lengths 1 may be formed using a suitable pipe working tool. Referring especially to FIGS. 5 to 9 a pipe working tool 30 according to the invention includes a tool housing 31 having opposed openings 32, 33 to receive a length of pipe, usually a copper pipe 34. In this case the tool 30 includes a pair of groove forming projections 35 which extend radially outwardly of a shaft 36 to engage the pipe. Another shaft 37 is used to locate and align the pipe within the tool housing 31. A cutting means in the form of a cutting wheel 39 is provided on the shaft 36 to cut the pipe to a pre-set length d so that the seal-receiving groove 2 of each pipe is always correctly positioned for efficient sealing, in use. The cutting and groove forming operations may be driven manually, for example by a handle 40 to rotate the shaft 36.

Figure 6:
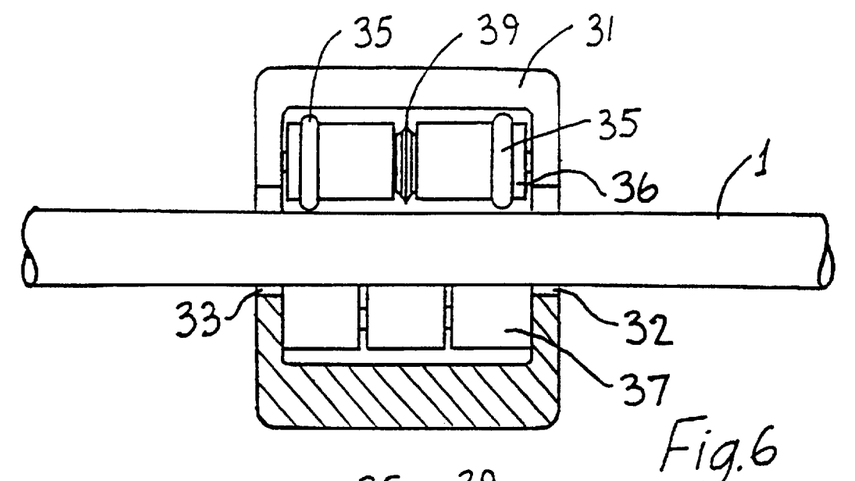
FIGS. 6 to 8 are side partially cross sectional views of the tool of FIG. 5, in operation.
Figure 7:
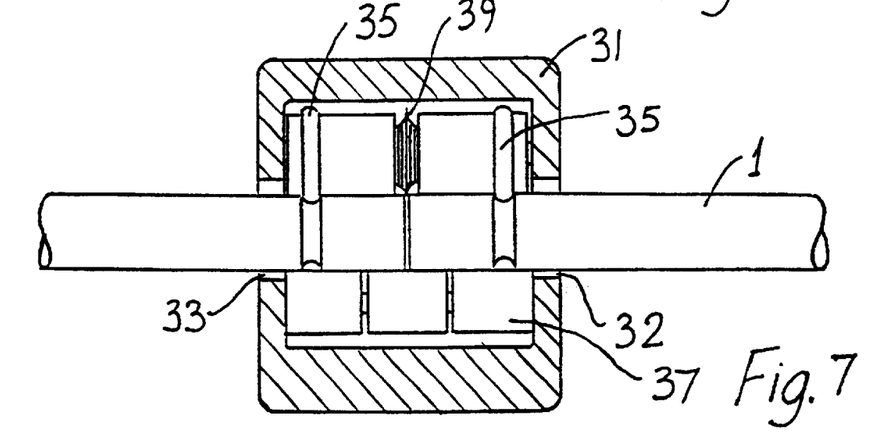
Figure 8:
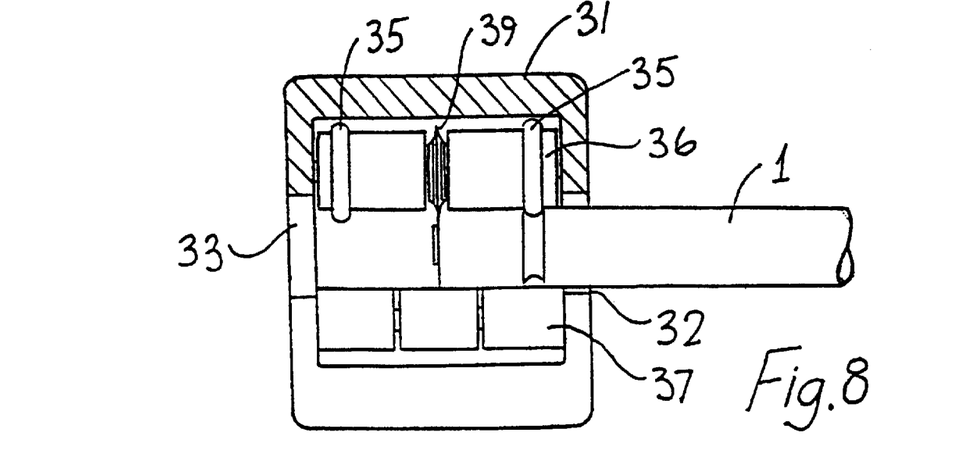
Figure 9:
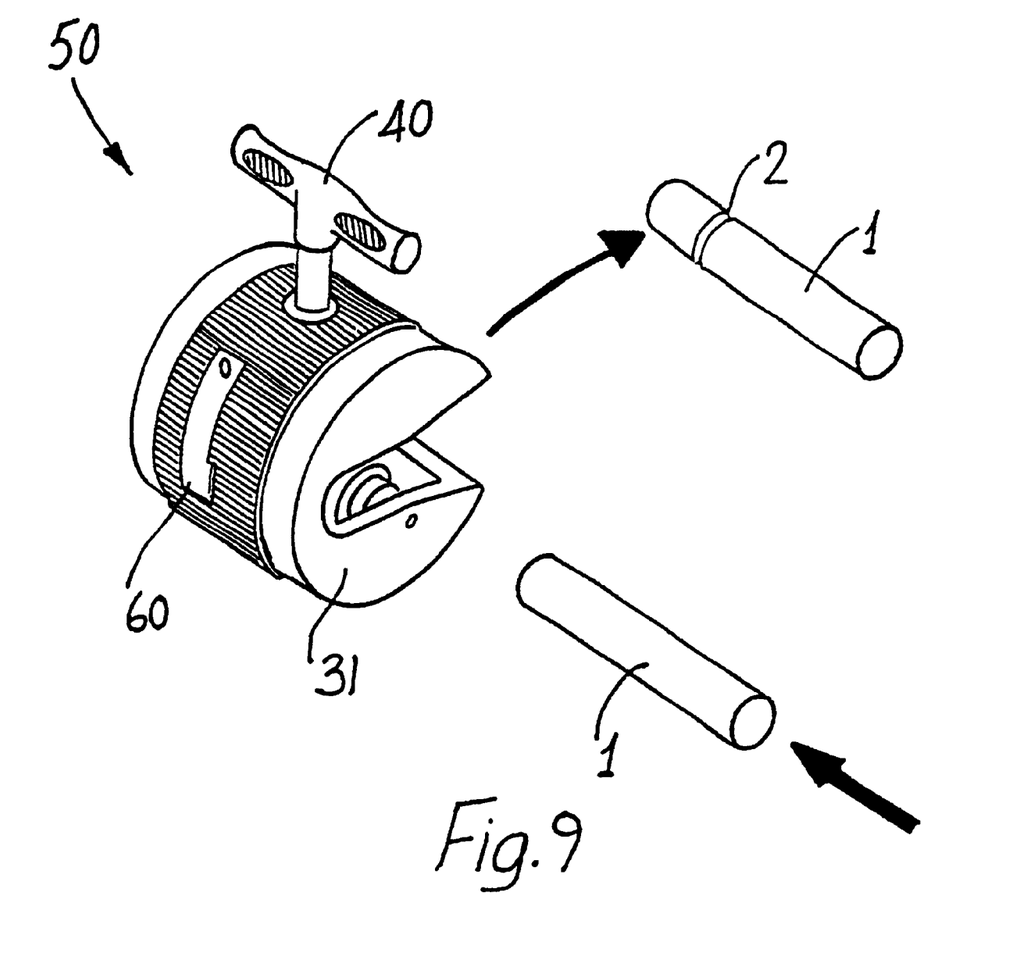
FIG. 9 is a perspective view of another pipe working tool of the invention.

In this the arrangement illustrated in FIGS. 6 to 8 two pipe lengths may be formed by grooving and cutting a single pipe simultaneously. Alternatively, as illustrated in FIG. 9 a pipe working tool 50 may be provided to form a single cut and grooved pipe length. The tool 50 is similar to the tool 30 and like parts are assigned the same reference numerals. The tools 30, 50 include a spring loaded depth stop 60 to position a pipe length to ensure that the groove(s) 2 are formed at the correct distance from the pipe end. When a pipe is to be grooved against the depth stop 60 the pipe is inserted from either end into the tool against the stop 60 and a groove is formed. When the pipe is to be cut and grooved it is inserted from the front direction. This has the effect of displacing the depth stop 60.

In more detail, the grooving wheels (which compress/sewage the pipe by deforming it inwards) are controlled to the correct depth by the cylindrical segments of the rollers either side of (and concentric with) the grooving wheels.

These cylindrical segments/rollers bear against a greater part of the pipe than the grooving wheels and thus form a depth stop.

In automatic sequence therefore, the grooving rollers come into contact with the pipe first as the two sets of pressure rollers are screwed down by the treated hand wheel. The pressure rollers form a triangle with the grooving rollers, forcing the pipe into contact. As the pressure rollers are tightened, the pipe is grooved in two places. Just as the pipe is reaching the depth stop which is formed by the cylindrical segments/rollers, the protruding cutting wheel comes into contact with the pipe between the grooves. The pipe is cut and falls into two halves.

The invention has very many advantages over prior art systems. The fitting can be pre-assembled and used as a push-in fitting a subsequent tightening by hand. The fitting requires less clamping pressure than conventional systems. In most cases hand tightening is sufficient to effect a high quality sealed connection. Because the sealing ring engages with and traps the pipe in the fitting the pipe fitting has excellent strength to resist pull-out of the pipe. At the same time, if necessary, the fitting is adjustable as the pipe, when fitted can be rotated in the fitting without breaking the seal. Joints cannot be tightened unless a pipe is correctly inserted. The fitting is exceptionally easy and quick to use. In contrast with conventional systems no solvent, heat or sanding is required.

The pipe working tool of the invention also has many advantages. The arrangement allows a pipe to be cut and grooved at the same time. A sealing groove can be formed simultaneously on both sides of a cut in a pipe length. The sealing groove is positioned automatically at a desired sealing distance from a pipe end. In addition, the groove is automatically formed to a desired depth.

It will be appreciated that any suitable groove forming means may be used such as heating, cutting, swaging or crimping. It will also be appreciated that the invention may be adapted for forming a groove in a pipe of any suitable material including a plastics pipe.

It will further be appreciated that while particular pipe working tools have been referred to, any suitable groove-forming tools may be used.

Figure 10:
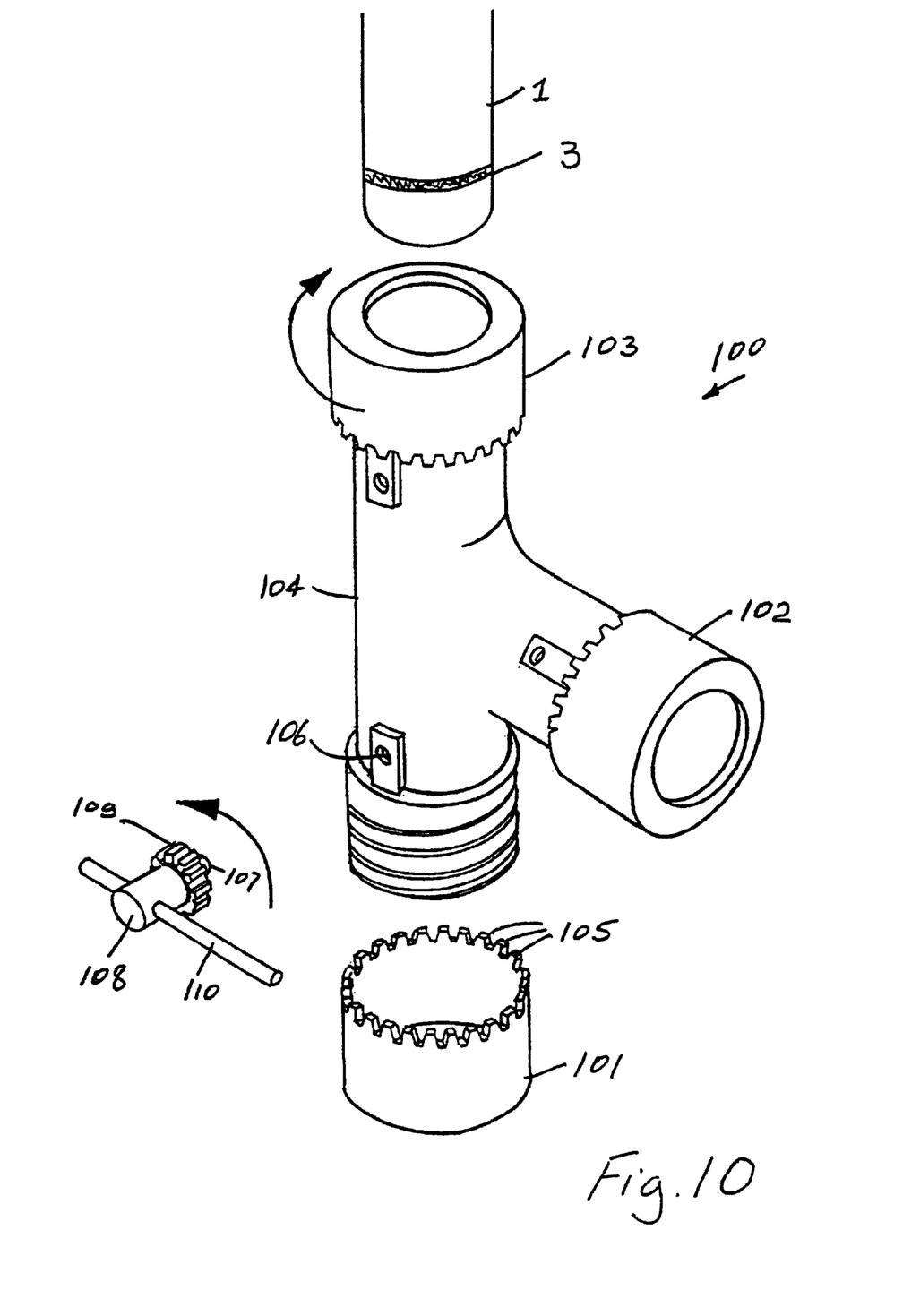
FIG. 10 is a perspective, partially exploded view of another pipe fitting according to the invention.
Figures 11, 12, 13, 14:
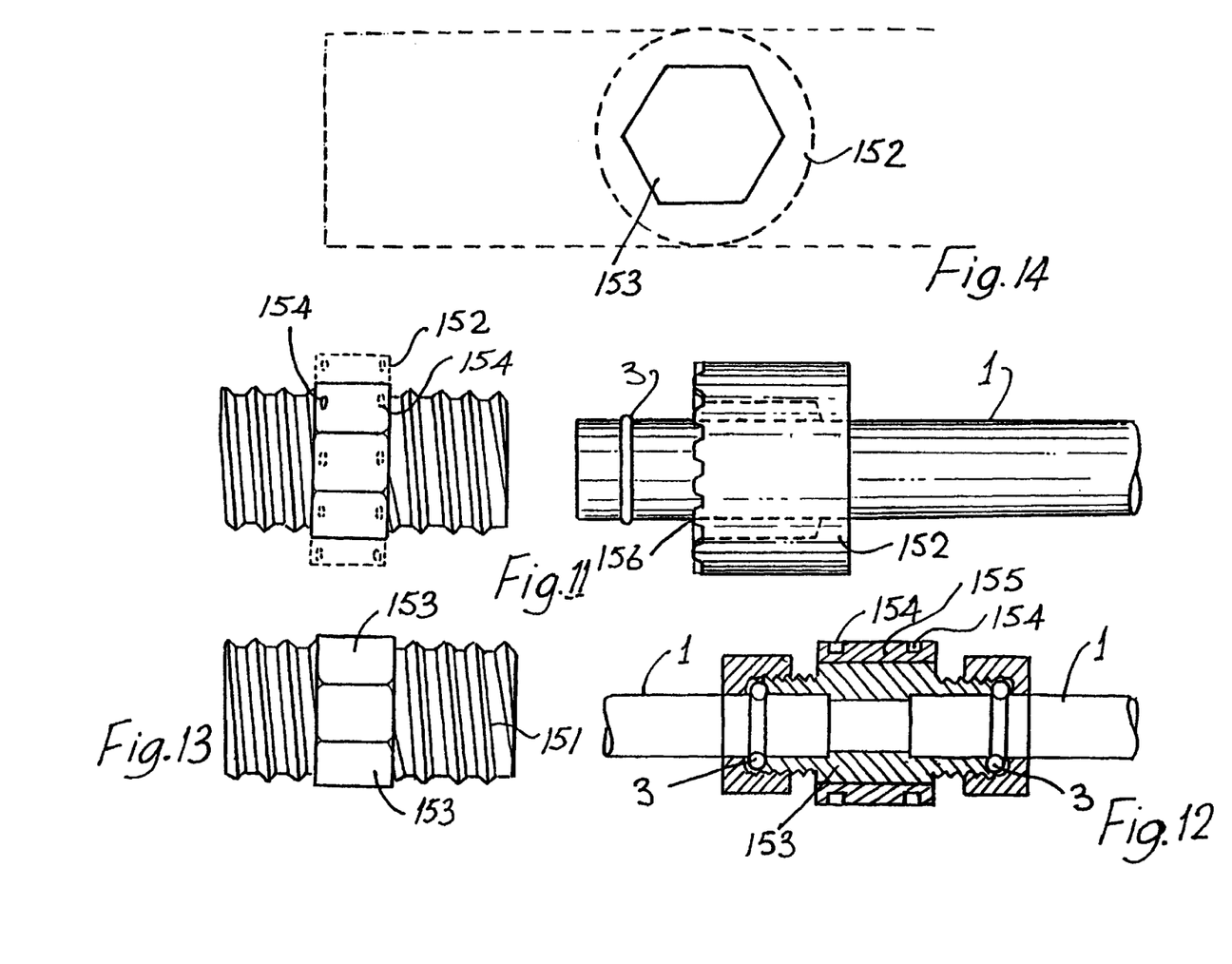
FIG. 11 is an exploded view of part of another pipe fitting of the invention.
FIG. 12 is a cross sectional view of the fitting of FIG. 11 assembled.
FIG. 13 is a view of a standard coupling housing.
FIG. 14 is an end view of the housing with a sleeve in place.

Referring to FIG. 10 there is illustrated another pipe fitting 100 according to the invention which in this case is configured as a T-shaped coupling. The fitting 100 is constructed and functions generally in the same manner to the couplings described above. In this case the fitting includes locking means for locking the caps 101, 102, 103 to the housing 104 to prevent unauthorised removal of the fitting and associated pipework. The locking means in this case is provided by a plurality of detents 105 which extend longitudinally from each cap 101, 102, 103. The housing 104 includes a recess 106 to receive the head 107 of a chuck-like special key 108 having a ratcheted section 109 and a ramble part 110. In use, when the following has been assembled as described above the hand 107 of the key 108 is engaged in the recess 106 and the key is operated so that the ratchet 109 engages with the detents 105 to turn the cap beyond hand tightedness. When the cap 101, 102, 103 has been tightened the key is removed. To loosen or remove the caps 101, 102, 103, the procedure is reversed using the special key 108.

Referring to FIGS. 11 to 14 there is illustrated another fitting 150 according to the invention which is similar to that described above with reference to FIG. 10. In this case, a housing 151 of the fitting is a standard off-the-shelf housing. A sleeve 152 is placed over a hexagonal section 153 of the housing 151. The sleeve which may be a force fit on the housing has a key receiving recess 154. A cap 155 in this case a has an under cross section and detents 156 which engage with the key on assembly to tighten the fitting as described above. The advantage of this arrangement is that an existing component may be used as part of the assembly.

It will of course be appreciated that in the version of FIGS. 11 to 14 the locking means may be omitted.

Figure 15:
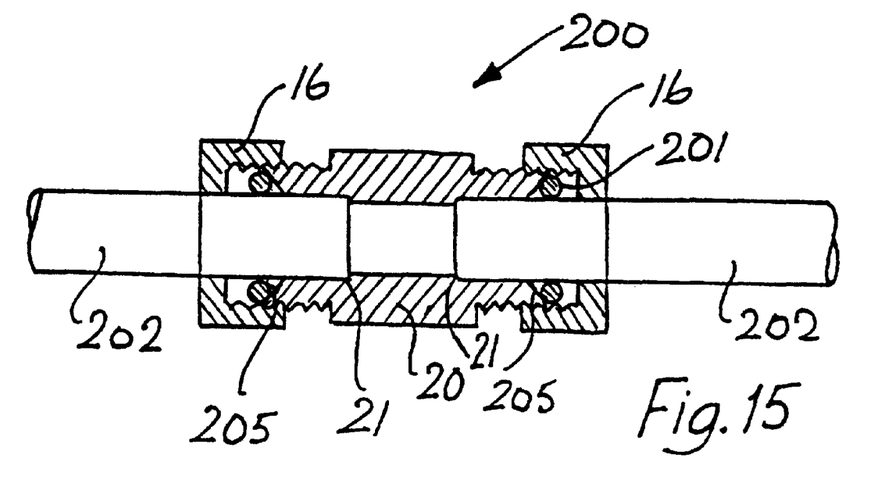
FIG. 15 is a cross sectional view of another fitting according to the invention.

Referring to FIG. 15 there is illustrated another fitting 200 according to the invention which is similar to the fitting described above with reference to FIGS. 1 to 4 and like parts are assigned the same reference numerals. In this case O-ring seals 201 is provided separately from the pipes 202 and the housing and/or clamping means have means for sealingly engaging the seal 201 against the pipe 202. For this purpose the housing 20 has an open-ended circumferential slot 205 which is tapered along the axis of the housing 20 to receive the seal 201. In use, a pipe 202 is push fitted into the assembled fitting to the stop position. The end cap 16 is then rotated by hand to compress the O-ring 201 and increase the seal. Such a tapered slot 205 is also provided in the fittings described above.

Many variations on the invention will be readily apparent and accordingly the invention is not limited to the embodiments hereinbefore described which may be varied in construction and detail.

What is claimed is:

1. A pipe fitting comprising:
   a pipe having a circumferential groove formed therein, the groove being axially spaced-apart a set distance from a free end of the pipe;
   a housing having an opening for receiving the pipe;
   a cap engageable with the housing;
   the housing having a seal receiver; and
   a seal locatable in the seal receiver of the housing;
   the housing having a stop against which the free end of the pipe is engageable, the stop being located a distance axially inwardly of the seal receiver substantially corresponding to the pipe set distance;
   the pipe being a push fit in the housing such that the free end of the pipe is engageable against the stop and the seal is thereby engageable in the groove of the pipe, the cap being axially movable relative to the housing to clamp the seal located in the pipe groove to seal the pipe in the housing and prevent pull out of the pipe from the housing.

2. A pipe fitting as claimed in claim 1 wherein the cap is screw threadingly engagable with the housing.

3. A pipe fitting as claimed in claim 1 including locking means for locking the pipe in the fitting.

4. A pipe fitting as claimed in claim 3 wherein the locking means locks the clamping means to the housing.

5. A pipe fitting as claimed in claim 3 wherein the locking means facilitates tightening of the clamping means beyond hand tightness.

6. A pipe fitting as claimed in claim 3 including a key for releasing the locking means.

7. A pipe fitting as claimed in claim 3 wherein the locking means comprises key-engagable detents on at least one of the housing and the cap for tightening of the cap to the housing.

8. A pipe fitting as claimed in claim 7 wherein the detents comprise a plurality of circumferentially spaced-apart teeth extending longitudinally from one of the housing and the cap and a key-receiving recess in the other of the housing and the cap, the cap being rotatable on engagements of the key in the key-receiving recess and rotation of the key.

9. A pipe fitting as claimed in claim 1 which is a straight-through coupling having a pair of axially aligned pipe receiving openings.

10. A pipe fitting as claimed in claim 1 wherein the seal is an O-ring seal.

11. A pipe fitting as claimed in claim 1 wherein the pipe is a copper pipe.

12. A pipe fitting as claimed in claim 1 wherein the housing is of a metallic material.

13. A pipe fitting as claimed in claim 1 wherein the housing is of a plastics material.

14. A pipe fitting as claimed in claim 1 wherein the seal receiver comprises an open-ended circumferential slot in the housing.

15. A pipe fitting as claimed in claim 14 wherein the slot tapers inwardly from an open end thereof.

16. A method for assembling a pipe fitting comprising the steps of:

forming a seal-receiving groove in a pipe a set distance from a free end of the pipe;

providing a housing having an opening for receiving a pipe, a pipe seal receiver and a pipe engagement stop axially spaced apart from the seal receiver;

providing a cap for the housing;

inserting a seal into the seal receiver of the housing;

attaching the cap to the housing;

inserting the pipe into the housing until the free end of the pipe is engaged against the stop, and the seal is engaged in the pipe groove; and tightening the cap to seal the pipe in the housing and to prevent pipe pull-out.

* * * * *